(12) United States Patent
Yoshimura

(10) Patent No.: US 6,229,770 B1
(45) Date of Patent: *May 8, 2001

(54) DISK STOCKER CONTROL FOR DISK REPRODUCING APPARATUS

(75) Inventor: Masaki Yoshimura, Sagamihara (JP)

(73) Assignee: Kabushiki Kaisha Kenwood, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/300,598

(22) Filed: Apr. 28, 1999

Related U.S. Application Data

(62) Division of application No. 08/727,421, filed as application No. PCT/JP96/00444 on Feb. 27, 1996.

(30) Foreign Application Priority Data

Feb. 27, 1995 (JP) .................................................. 7-61578

(51) Int. Cl.$^7$ .................................................. G11B 17/22
(52) U.S. Cl. .............................................. 369/36; 369/38
(58) Field of Search ................................... 369/33, 34, 36, 369/38, 178, 191, 192

(56) References Cited

U.S. PATENT DOCUMENTS

| | | | |
|---|---|---|---|
| 5,146,446 | * 9/1992 | Ota et al. ........................... | 369/178 X |
| 5,216,645 | 6/1993 | Sakayama ............................. | 369/36 |
| 5,226,032 | * 7/1993 | Ikedo et al. ......................... | 369/178 |
| 5,327,412 | 7/1994 | Lee ................................... | 369/178 X |
| 5,384,760 | * 1/1995 | Kumakura ............................. | 369/38 |
| 5,621,708 | * 4/1997 | Fujita et al. ........................ | 369/38 |

FOREIGN PATENT DOCUMENTS

| | | |
|---|---|---|
| 44 27 494 A1 | 2/1995 | (DE) . |
| 0 563 927 A2 | 10/1993 | (EP) . |
| 0 612 070 A2 | 8/1994 | (EP) . |
| 0 614 178 A2 | 9/1994 | (EP) . |
| 0 709 841 A1 | 5/1996 | (EP) . |
| 59-94271 | 5/1984 | (JP) . |
| 3-147563 | 6/1991 | (JP) . |
| 6-309767 | 11/1994 | (JP) . |

* cited by examiner

Primary Examiner—George J. Letscher
(74) Attorney, Agent, or Firm—Eric J. Robinson; Nixon Peabody LLP

(57) ABSTRACT

A stocker (21) accommodates a disk, and an pickup (70a) reproduces the disk on a turntable (70b). A slider tray (31) transports the disk between the stocker and the outside of an apparatus. A loading slider (9) transports the disk between the stocker and a reproduction position. The apparatus further includes a stocker up/down moving slider (25) for determining a relative height of the disk and an open/close key for protruding the disk from the apparatus or accommodating the disk in the apparatus. Upon activation of the open/close key, one disk outside the apparatus is accommodated into the stocker (21) and then another disk under reproduction is accommodated into the stocker (21).

2 Claims, 11 Drawing Sheets

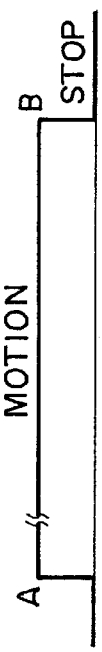
FIG. 9A MAIN SLIDER STROKE
FIG. 9B TRAY STROKE
FIG. 9C CARRIER STROKE
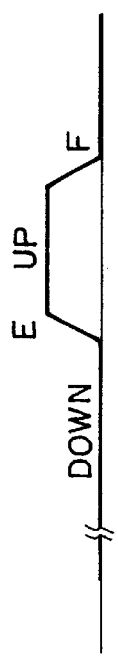
FIG. 9D DISK POSITION DETECTION
FIG. 9E TURN-TABLE
FIG. 9F CAM GEAR
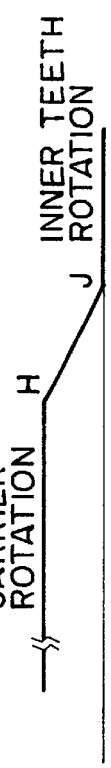
FIG. 9G PLANET GEAR
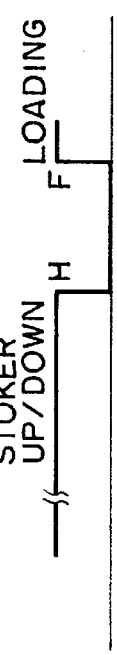
FIG. 9H STOKER UP/DOWN OR LOADING

DISK STOCKER CONTROL FOR DISK REPRODUCING APPARATUS

This application is a Divisional application of Ser. No. 08/727,421, filed Oct. 18, 1996; which itself is a 371 of PCT/JP96/00444, filed Feb. 27, 1996.

FIELD OF THE INVENTION

The present invention relates to a recording medium reproducing apparatus with a recording medium exchanger, and more particularly to a recording medium reproducing apparatus capable of exchanging a recording medium even during reproduction.

BACKGROUND OF THE INVENTION

As a recording medium reproducing apparatus with a recording medium exchanger, a disk reproducing apparatus such as shown in FIG. 13 is known in which a magazine inserted with disks is externally loaded in the apparatus and a disk in the magazine is selected and reproduced.

In replacing a disk in the magazine of such a disk reproducing apparatus, disks are exchanged by picking up the magazine from the apparatus. If a disk in the magazine is being reproduced and another disk is to be inserted into the magazine at the place where the reproducing disk was inserted, the disks collide when the reproducing disk is placed back in the magazine. Therefore, dismounting the magazine is inhibited and replacing a disk in the magazine cannot be allowed during the reproduction.

Another problem is that the total cost of the apparatus rises because of an expensive magazine. Furthermore, even if only one disk in the apparatus is to be replaced, the magazine is required to be dismounted so that there is associated with a problem of a cumbersome disk exchange operation.

An example of a disk reproducing apparatus with a disk changer and without a magazine is disclosed in Japanese Patent Laid-open Publication No. 4-38673 and shown in FIG. 14. A stocker shown in FIG. 14 has a plurality of carriers on which disks can be placed. The stocker is moved up and down by a stocker moving means so that a desired carrier is positioned at a height where the carrier is pulled out by a tray.

The tray moves between a load position shown in FIGS. 14(a) and 14(b) and an eject position shown in FIG. 14(c). As shown in FIG. 14(a), the carrier with a desired disk placed thereon is pulled out and placed on the tray at the load position, and as shown in FIG. 14(d), a reproducing means clamps the disk for the reproduction.

The tray with a desired disk placed thereon is moved from the position shown in FIG. 14(a) to the position shown in FIG. 14(c), the carrier on the tray is exposed outside of the housing so that the disk on the carrier can be replaced or a new disk can be placed on the carrier. The tray with a carrier placed thereon is moved from the position shown in FIG. 14(c) to the position shown in FIG. 14(a), and the carrier on the tray is placed back in the stocker. In this manner, disk exchange or insertion of a disk into the apparatus can be performed.

With such disk reproducing apparatus, a disk is moved to a reproduction position or to the outside by a transport means for transporting a carrier in one direction. The carrier with a disk placed thereon is moved from the stocker to the outside via the reproduction position. There is therefore a problem that disks cannot be exchanged during the reproduction. A user often determines the disk to be next reproduced, during the reproduction of a current disk. There is a strong need of exchanging or adding disks during the reproduction if the apparatus does not contain a disk to be next reproduced.

SUMMARY OF THE INVENTION

The present invention has been made under the above circumstances. An object of the invention is to provide a recording medium reproducing apparatus capable of exchanging or adding recording media other than a recording medium being reproduced, during the reproduction, and having a simple drive mechanism for recording medium exchange and load.

A recording medium reproducing apparatus of this invention comprises: a stocker capable of accommodating a recording medium; reproducing means for reproducing the recording medium; first transport means for transporting the recording medium between the stocker and the outside of the apparatus; second transport means for transporting the recording medium between the stocker and a reproduction position; position determining means for determining a relative height of the recording medium and the first or second transport means; and an open/close key for protruding the recording medium from the apparatus and accommodating the recording medium in the apparatus, wherein upon activation of the open/close key, the recording medium is accommodated in the stocker if the recording medium is protruded from the apparatus, the recording medium is protruded from a housing if the recording medium is accommodated in the stocker, or the recording medium is accommodated in the stocker and protruded from the apparatus after the reproduction is stopped if the recording medium is under the reproduction.

A recording medium reproducing apparatus of this invention comprises: a stocker capable of accommodating a recording medium; reproducing means for reproducing the recording medium; first transport means for transporting the recording medium between the stocker and the outside of the apparatus; second transport means for transporting the recording medium between the stocker and a reproduction position; position determining means for determining a relative height of the recording medium and the first or second transport means; and an open/close key for protruding the recording medium from the apparatus and accommodating the recording medium in the apparatus, wherein upon activation of the open/close key, the recording medium is accommodated in the stocker by the first transport means if the recording medium is protruded from the apparatus, the recording medium is protruded from a housing by the first transport means if the recording medium is accommodated in the stocker, or the recording medium is accommodated in the stocker by the second transport means and protruded from the apparatus by the first transport means after the reproduction is stopped if the recording medium is under the reproduction.

A recording medium reproducing apparatus of this invention comprises: a stocker capable of accommodating a recording medium; reproducing means for reproducing the recording medium; first transport means for transporting the recording medium between the stocker and the outside of the apparatus; second transport means for transporting the recording medium between the stocker and a reproduction position; position determining means for determining a relative height of the recording medium and the first or second transport means; and an open/close key for protruding the recording medium from the apparatus and accommodating the recording medium in the apparatus, wherein upon activation of the open/close key designating one recording medium accommodated in the stocker in a state that another recording medium is protruded from the apparatus, the other recording medium outside of the apparatus is accommodated in the stocker and the selected one recording medium is protruded from a housing.

A recording medium reproducing apparatus of this invention comprises: a stocker capable of accommodating a recording medium; reproducing means for reproducing the recording medium; first transport means for transporting the recording medium between the stocker and the outside of the apparatus; second transport means for transporting the recording medium between the stocker and a reproduction position; position determining means for determining a relative height of the recording medium and the first or second transport means; and an open/close key for protruding the recording medium from the apparatus and accommodating the recording medium in the apparatus, wherein upon activation of the open/close key designating one recording medium under the reproduction in a state that another recording medium is protruded from the apparatus, the other recording medium outside of the apparatus is accommodated in the stocker, the reproduction of the one recording medium is stopped, the one recording medium is accommodated in the stocker and protruded from a housing.

A recording medium reproducing apparatus of this invention comprises: a stocker capable of accommodating a recording medium; reproducing means for reproducing the recording medium; first transport means for transporting the recording medium between the stocker and the outside of the apparatus; second transport means for transporting the recording medium between the stocker and a reproduction position; position determining means for determining a relative height of the recording medium and the first or second transport means; and an open/close key for protruding the recording medium from the apparatus and accommodating the recording medium in the apparatus, wherein upon activation of the open/close key designating one recording medium not under the reproduction in a state that another recording medium is under the reproduction, the one recording medium is protruded from the apparatus and accommodated in the apparatus, and the place of the stocker where the other recording medium under the reproduction is moved to the place where the other recording medium under the reproduction is accommodated.

Each recording medium reproducing apparatus described above further comprises a carrier with a recording medium placing unit for placing the recording medium, wherein the stocker is capable of accommodating the carrier, the first transport means transports the carrier between the stocker and the outside of the apparatus, the second transport means transports the carrier between the stocker and the reproduction position, the position determining means determines the relative height between the carrier and the first or second transport means, and the open/close key protrudes the carrier from the apparatus and accommodating the carrier into the apparatus.

The recording medium reproducing apparatus of this invention comprises: a stocker capable of accommodating a recording medium; reproducing means for reproducing the recording medium; first transport means for transporting the recording medium between the stocker and the outside of the apparatus; second transport means for transporting the recording medium between the stocker and a reproduction position; position determining means for determining a relative height of the recording medium and the first or second transport means; and an open/close key for protruding the recording medium from the apparatus and accommodating the recording medium in the apparatus. With such a recording medium reproducing apparatus, a user can make a complicated operation be performed only by activating the open/close key which selects a desired recording medium. Specifically, upon activation of the open/close key, the recording medium can be accommodated in the stocker if the recording medium is protruded from the apparatus, the recording medium can be protruded from a housing if the recording medium is accommodated in the stocker, or the recording medium can be accommodated in the stocker and protruded from the apparatus after the reproduction is stopped if the recording medium is under the reproduction.

Further, upon activation of the open/close key designating one recording medium accommodated in the stocker in a state that another recording medium is protruded from the apparatus, the other recording medium outside of the apparatus can be accommodated in the stocker and the selected one recording medium can be protruded from a housing.

Still further, upon activation of the open/close key designating one recording medium under the reproduction in a state that another recording medium is protruded from the apparatus, the other recording medium outside of the apparatus can be accommodated in the stocker, the reproduction of the one recording medium can be stopped, and the one recording medium can be accommodated in the stocker and protruded from a housing.

Furthermore, upon activation of the open/close key designating one recording medium not under the reproduction in a state that another recording medium is under the reproduction, the one recording medium can be protruded from the apparatus and accommodated in the apparatus, and the place of the stocker where the other recording medium under the reproduction can be moved to the place where the other recording medium under the reproduction is accommodated.

BRIEF DESCRIPTION OF THE DRAWINGS

FIGS. 9A, 9B, 9C, 9D, 9E, 9F, 9G, and 9H are charts illustrating the operation of the disk reproducing apparatus according to the embodiment of the invention.

DESCRIPTION OF THE EMBODIMENTS

Figure 10:
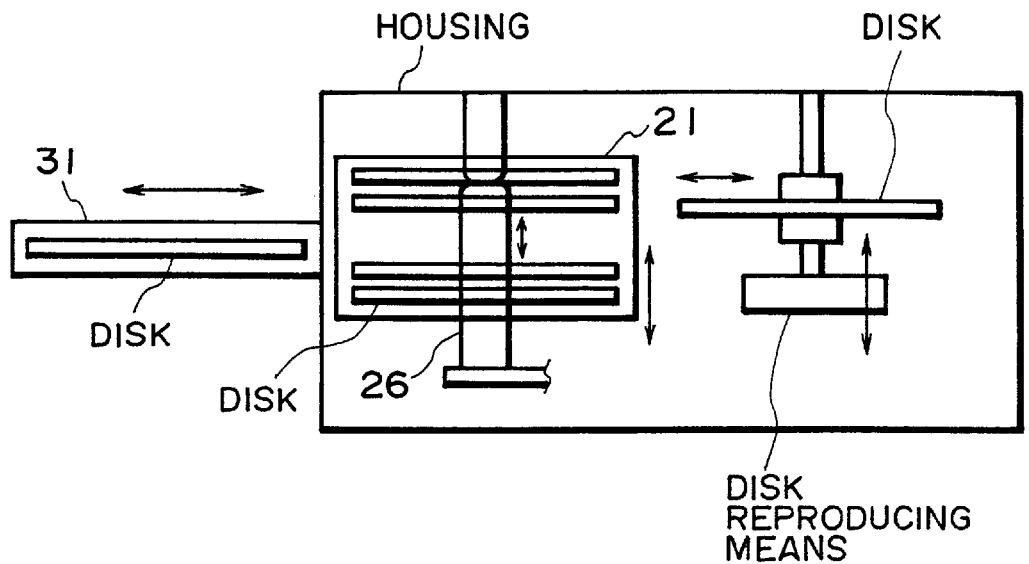
FIG. 10 is a diagram showing the outline of the structure of the disk reproducing apparatus according to the embodiment of the invention.

A disk reproducing apparatus according to an embodiment of the invention will be described with reference to the accompanying drawings. First, with reference to FIG. 10, the outline of the disk reproducing apparatus will be described. On a shelf at each step of a stocker mounted in a housing, a carrier (although not shown in FIG. 10) capable of placing a disk thereon is housed being moved up and down so as to align a desired carrier to a pull-out height.

A slider tray 31 constituting a first transport means moves between the inside and outside of the housing to expose a carrier in the stocker 21 to the outside of the housing so that a disk on the carrier can be replaced or a disk can be additionally placed thereon. After a disk on the carrier is exchanged or a disk is added, the slider tray 31 accommodates the disk in the stocker 21.

A second transport means (not shown in FIG. 10) pulls out a carrier in the stocker 21 at a different height from the slider tray 31 and transports it to the position of a disk reproducing means. The disk placed on the carrier is clamped by the disk reproducing means and reproduced.

A disk position detecting member 26 is mounted movable up and down through the central hole of a disk placed on the carrier, and set at the position lower than the carrier transport position when the first and second transport means move the carrier in and out of the stocker 21.

The first transport means pulls out the carrier from the stocker 21 to the side opposite to the disk reproducing means. Therefore, in both the disk holding and releasing states of the disk reproducing means, disk exchange or addition relative to the stocker can be performed.

A second motor drives the second transport means and stocker transport means, a first motor drives the first transport means and a disk clamp means of the disk reproducing means, and the power of the second motor is switched between the second transport means and the stocker transport means.

Figure 1:
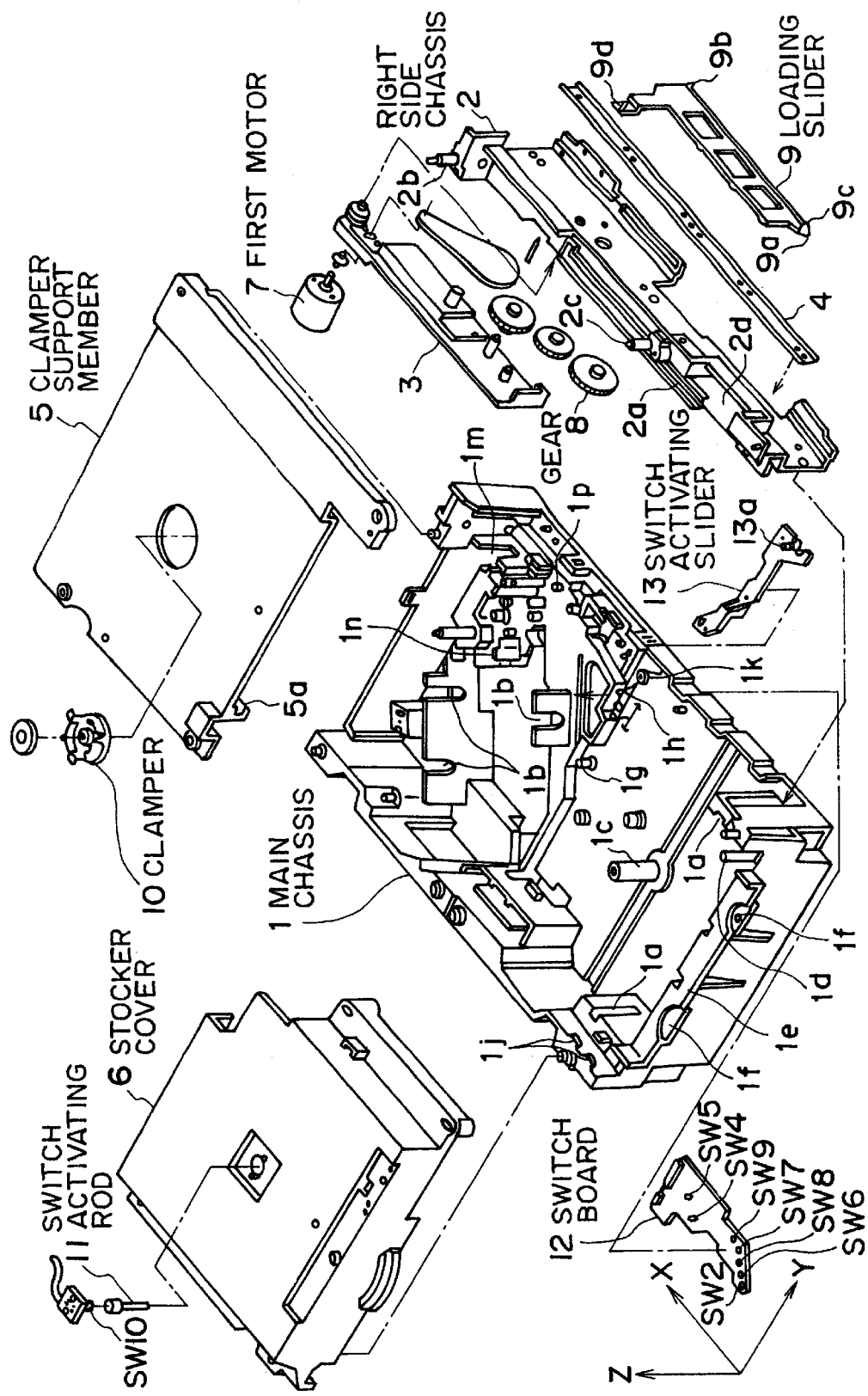
FIG. 1 is a broken perspective view showing part of a disk reproducing apparatus according to an embodiment of the invention.

Next, with reference to FIGS. 1 to 9, the details of the embodiment will be given. FIGS. 1 to 4 are broken perspective views of parts of the disk reproducing apparatus according to the embodiment of the invention. The positive directions of X-, Y-, Z-axes shown in FIG. 1 are called back, right, and up directions in the following description. The positions and directions of components shown in FIGS. 2 to 4 have the same relation as those shown in FIG. 1.

Reference numeral 1 in FIG. 1 represents a main chassis for supporting all components shown in FIGS. 1 to 4. A right side chassis 2 is fastened to the right side of the main chassis 1. A gear train support member 3 and a guide plate 4 are fastened to the right side chassis 2. Rotation of the first motor 7 fastened to the gear train support member 3 is transmitted to a gear 8 via a belt and idler gears. These driving mechanism components are supported by the gear train support member 3.

A loading slider 9 is supported by the guide plate 4, sliding freely in front and back directions. The loading slider 9 has a rack 9a at the lower left side, the rack 9a meshing with an outer teeth 52a of an inner teeth gear 52. The inner teeth gear 52 drives the loading slider 9 in the front and back directions. A clamper support member 5 is fastened to a rear upper side of the main chassis 1 to hold a clamper 10.

Figure 2:
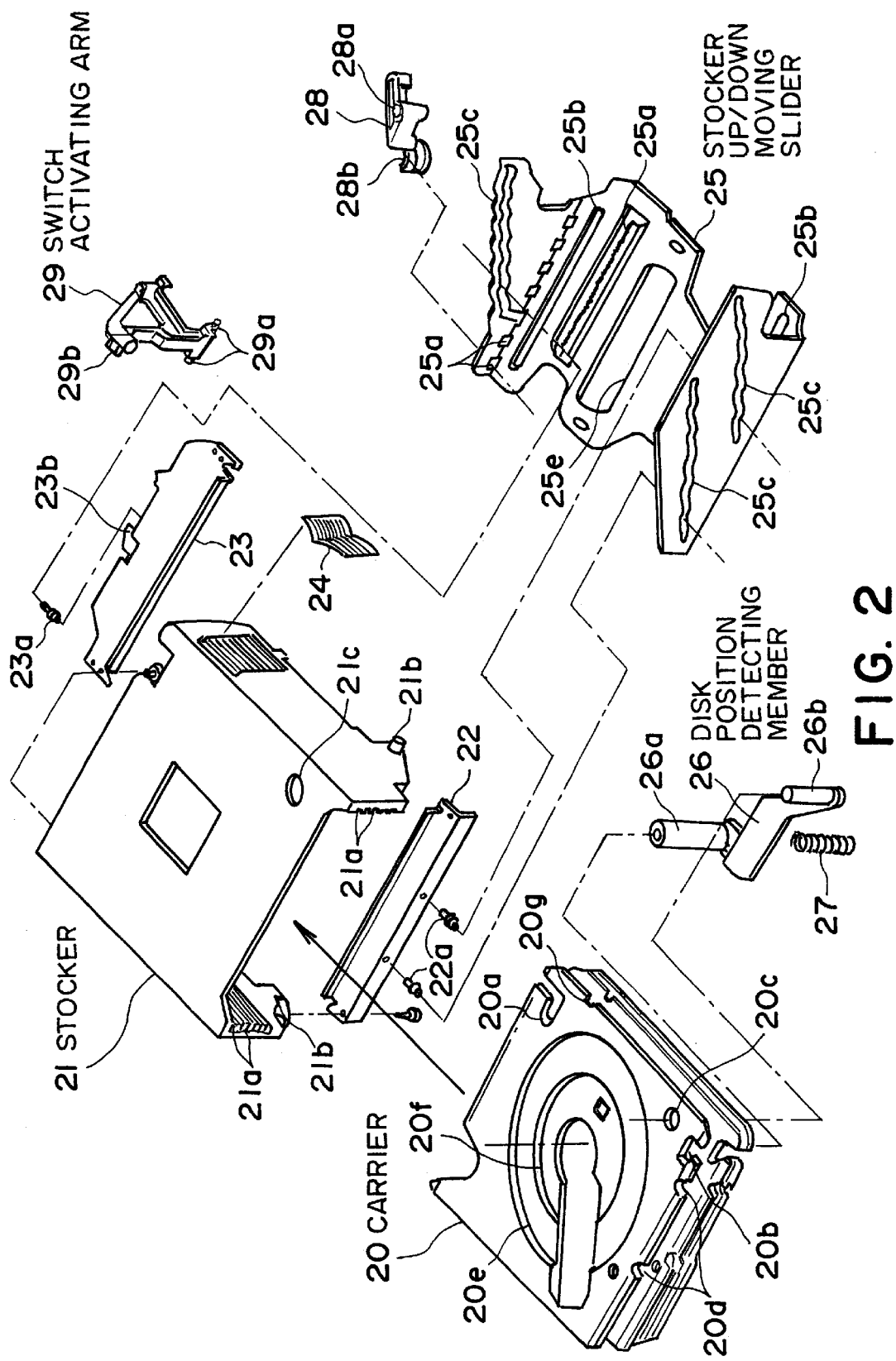
FIG. 2 is a broken perspective view showing part of the disk reproducing apparatus according to the embodiment of the invention.

A stocker cover 6 is fastened to the front upper side of the main chassis 1, covering the upper side of the stocker 21 shown in FIG. 2. A switch activating rod 11 is supported movable up and down by a cylindrical portion extending downward at the central area of the stocker cover 6. A switch SW 10 is fixed to the stocker cover 6, facing the switch activating rod 11 via a board. Although not shown, an engaging rod is mounted on the rear side of the stocker cover at the position corresponding to a hole 21c of the stocker 21 shown in FIG. 2. The length of this engaging rod is generally the same as that of the switch activating rod.

Switches SW2, SW4–SW9 are mounted on a switch board 12 which is fixed to the bottom of the main chassis 1. A switch activating slider 3 is supported by the main chassis movable in right and left directions. A projection 13a formed on the switch activating slider abuts against projections 9b and 9c of the loading slider 9. As the loading slider 9 moves back, i.e., to the loading position, the projection 9c of the loading slider 9 pushes via the projection 13a the switch activating slider 13 right side to activate the switch SW7, whereas as the loading slider 9 moves front, i.e., to the carrier housing position, the projection 9b of the loading slider 9 pushes via the projection 13a the switch activating slider 13 left side to activate the switch SW8.

A carrier 20 shown in FIG. 2 places a disk thereon in position by using a large diameter recess 20e or a small diameter recess 20f. Six carriers can be housed in the stocker 21, being supported by grooves 21a, 21a, . . . formed in the inner wall of the stocker 21. A plate spring 24 fixed to the stocker 21 engages with a recess 20g of the carrier 20 to place the carrier 20 loosely. A hook engaging notch 20b of the carrier 20 engages with a hook 36a of a carrier pull-out member 36 shown in FIG. 3. Therefore, the carrier 20 can be moved by the carrier pull-out member 36 between the stocker 21 and the outside of the housing.

Figure 3:
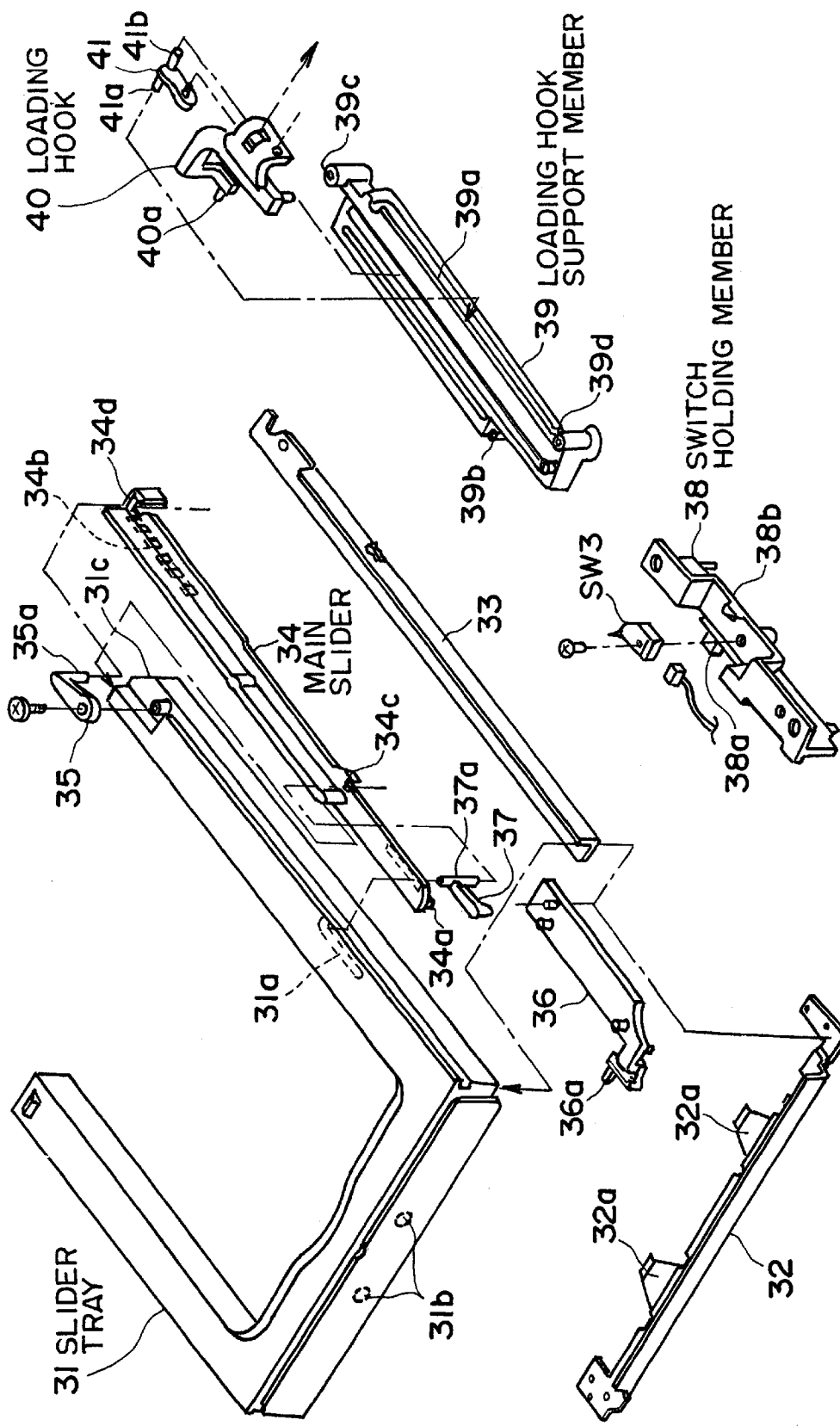
FIG. 3 is a broken perspective view showing part of the disk reproducing apparatus according to the embodiment of the invention.

The hook notch 20a of the carrier 20 also engages with a hook 40a of a loading hook 40 shown in FIG. 3. Therefore, the carrier 20 can be moved by the loading hook 40 between the stocker 21 and the reproduction position. The carrier pull-out member 36 and its drive mechanism constitute the first transport means, and the loading hook 40 and its drive mechanism constitute the second transport means.

Shafts 21a and 21b of the stocker 21 engage with vertical grooves 1a and 1a formed in the main chassis 1. Shafts 22a, 22a, and 23a mounted upright on front and back plates 22 and 23 fastened to the lower side of the stocker 21 engage with stepwise grooves 25c, 25c, . . . of a stocker up/down moving slider 25.

An elongate hole 25e of the stocker up/down moving slider 25 has a guide rod 1c of the main chassis 1 being inserted therein, and grooves 25b, 25b thereof have a shaft (not shown) on the main chassis 1 being fitted therein. Therefore, the stocker up/down moving slider 25 is supported by the main chassis 1, sliding freely to the right and left directions. The stocker up/down moving slider 25 is driven by a gear 56 meshing with a rack 25a (shown in FIG.

4). As the stocker up/down moving slider 25 moves, the stocker 21 is moved up and down. The stocker up/down moving slider 25 and its drive mechanism constitute the stocker transport means.

A disk position detecting member 26 has hollow portions formed in rod-like projections 26a and 26b, the follow portions engaging with the guide rods 1c and 1d of the main chassis 1, allowing the disk position detecting member 26 to move up and down. A compression coil spring 27 sandwiched between the main chassis 1 and the disk position detecting member 26 energizes upward the disk position detecting member 26. A recess formed in the top end portion of an arm 58 shown in FIG. 4 engages with the distal end portion of the rod-like projection 26a of the disk position detecting member 26. The arm 58 moves up and down the disk position detecting member 26. As the disk position detecting member 26 moves up, the switch SW10 is activated by the switch activating rod 11. The rod-like projection 26a is inserted into the central hole of a disk in the stocker 21, and the rod-like projection 26b is inserted into a hole 20c of the carrier 20 in the stocker 21. This hole 20c is formed outside of the larger diameter disk recess 20e of the carrier 20. The stocker 21 is formed with a hole 21c at the position corresponding to the hole 20c of the carrier 20 in the stocker 20.

A switch activating arm 28 is rotatively supported by a shaft 11g of the main chassis 1 via its hole 28a. The right side end of the switch activating arm 28 abuts against the switch SW6. A projection 28b is fitted in holes 25d, 25d, . . . of the stocker up/down moving slider 25. Each time the projection 28b passes through the hole 25d, the switch activating arm 28 is swung. Each time the protrusion 28b passes through the hole 25d, the switch SW6 turns on and off. A pitch between the holes 25d and 25d is equal to a motion distance of one step of the carrier 20.

The switch activating arm 29 is rotatively supported via its shaft 29a by a boss 1h of the main chassis 1 formed slightly right at the central area, the lower back end portion of the switch activating arm 29 abutting against the switch SW9. A projection 29b is set to the position corresponding to a step from which the carrier is pulled out by the carrier pull-out member 36, and abuts against the back end portion of the carrier 20 at that position. Therefore, the switch activating arm 20 rotates as the carrier 20 is pulled out of or into the stocker. The switch SW9 detects that the carrier 20 was pulled into the stocker 21 by the carrier pull-out member 36, or detects a presence/absence of a carrier at the step from which the carrier is pulled out by the carrier pull-out member 36. A tongue 23b of the back plate 23 activates the switch SW2 when the stocker 21 moves to the lowest position. A control circuit can store the position of the stocker 2 in the following manner. The stocker position at the lowest position is represented by "0". As the stocker 21 is moved up, the stocker position is counted up each turn-on/off of the switch SW6, whereas as the stocker 21 is moved down, the stocker position is counted down each turn-on/off of the switch SW6.

Figure 5:
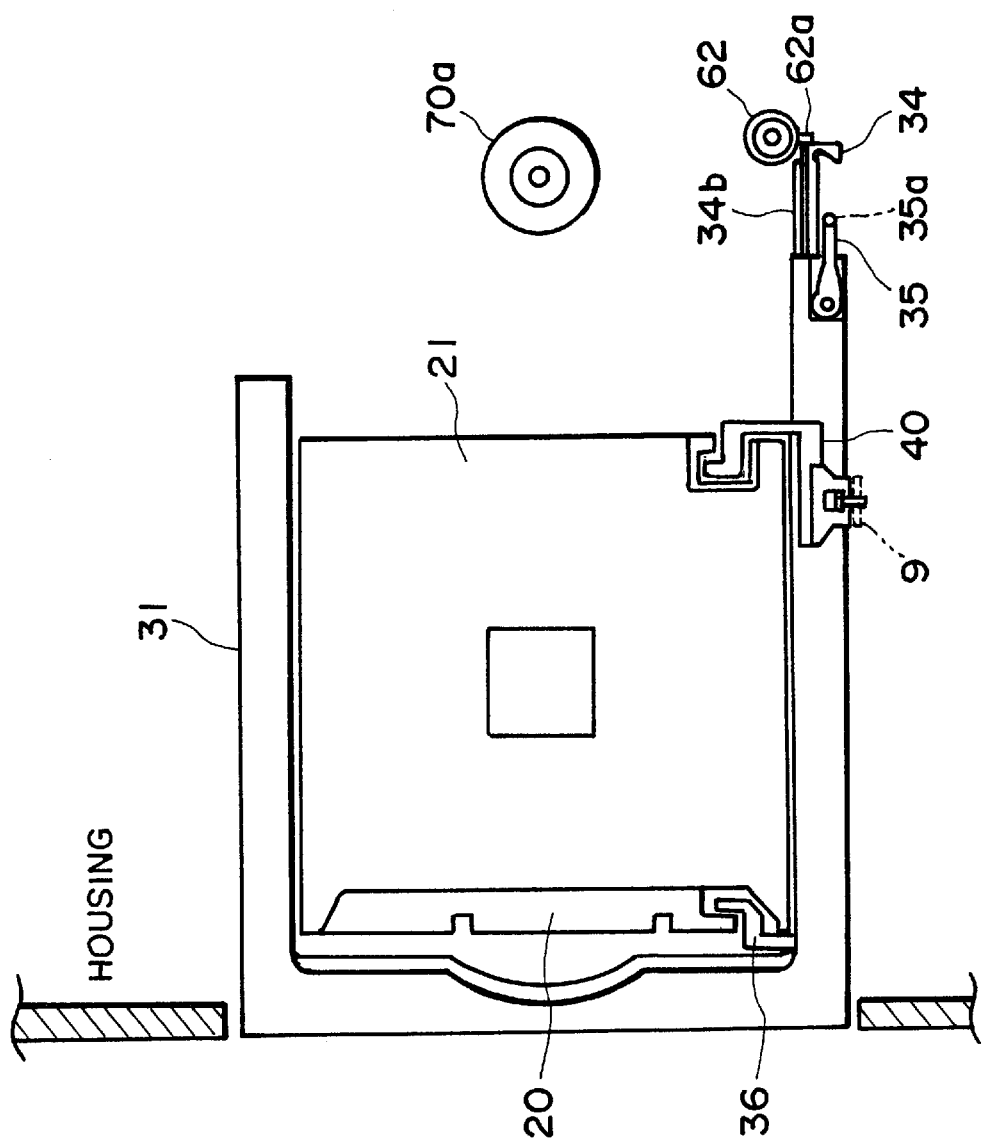
FIG. 5 is a plan view showing part of the disk reproducing apparatus according to the embodiment of the invention.
Figure 6:
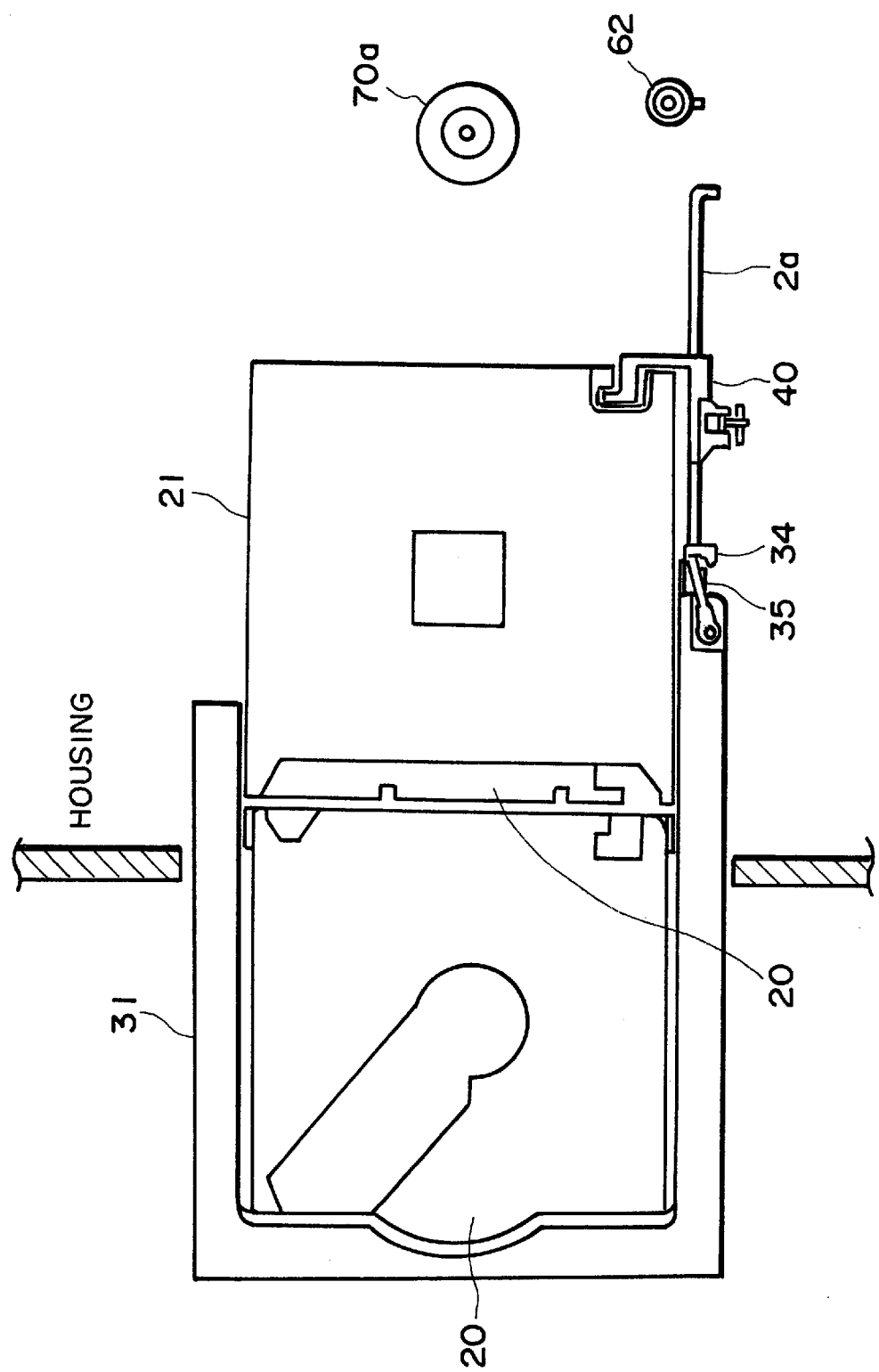
FIG. 6 is a plan view showing part of the disk reproducing apparatus according to the embodiment of the invention.

A switch holding member 38 shown in FIG. 3 is fastened to the right side chassis 2 shown in FIG. 1, by fitting a channel-shaped projection 38b formed on the lower side into a channel-shaped recess 2d formed on the front side of the right side chassis 2. A slider tray 31 is supported by the main chassis 1 and switch holding member 38, being movable in the front and back directions. Namely, a projection 38a of the switch holding member 38 engages with a groove (not shown in FIG. 3 because it is formed at a hidden position in FIG. 3) formed in the right side plane of the slider tray 31, and a projection 1j of the main chassis 1 at the left side engages with a groove (not shown in FIG. 3 because it is formed at a hidden position in FIG. 3) formed in the left side plane of the slider tray 31. The positional relationship between the slider tray 31 and stocker 21 is illustrated in FIGS. 5 and 6. FIG. 5 shows a state that the slider tray 31 moves the carrier 20 back into the stocker 21, and FIG. 6 shows a state that the slider tray 31 moves the carrier 20 to the outside of the housing. As shown, since the slider tray 31 is disposed holding the stocker 21 from the right and left sides, the slider tray 31 provides a support portion longer at the right and left sides so that the stocker can be supported stably, freely sliding in the back and front directions, and as will be later described, a main slider 34 and the carrier pull-out member 36 can be stably supported. Furthermore, the slider tray 31 surrounds the stocker 21 when the slider tray 31 is accommodated in the housing. Therefore, a large stroke of the slider tray 31 can be provided even in a narrow space so that the carrier 20 can be pulled out by a long distance.

An operation piece of the switch SW3 fastened to the switch holding member 38 is being pushed to the right side of the slider tray 31 when the slider tray 31 is accommodated in the housing or when it is pulled out to the outside of the housing. However, this pressure to the operation piece is released at the end of the transport stroke of the slider tray 31 to the outside of the housing and the operation piece of the switch SW3 faces a back end slope portion 31c of the slider tray 31. Specifically, the switch SW3 is activated at the open position of the slider tray 31 to detect the open position of the slider tay 31.

A guide plate 33 is fastened to the lower side of the slider tray 31. The guide plate 33 and slider tray 31 surround and support the main slider 34 and carrier pull-out member 36 to be movable in the front direction.

The rack 34a formed on the main slider 34 on the lower side along the front and back directions meshes with the gear 8 shown in FIG. 1 and moves in the front and back direction as the first motor 7 rotates normally or reversely. The main slider 34 moves the slider tray 31 and carrier pull-out member 36, and rotates a gear 62 shown in FIGS. 4 to 6.

Specifically, a shaft 37a of a rotary member 37 rotatively supported by the carrier pull-out member 36 engages with a J-shaped groove 31a formed in the slider tray 31, and is engageable with a recess 34c of the main slider 34. While the main slider 34 moves back, the shaft 37a engages with a right projection of the J-shaped groove 31a and does not engage with the recess 34c. Therefore, the main slider 34 does not drive the carrier pull-out member 36.

As the main slider moves forward, the recess 34c catches the shaft 37a so that the shaft 37a engages with the linear portion of the J-shaped groove 31a and the carrier pull-out member 36 is driven.

A shaft 35a of a rotary member 35 rotatively supported by the slider tray 31 engages with a J-shaped groove 2a formed in the right side chassis 2 shown in FIG. 1, and is engageable with a recess 34d of the main slider 34. While the main slider 34 moves back, the shaft 35a engages with a right projection of the J-shaped groove 2a and does not engage with the recess 34d. Therefore, the main slider 34 does not drive the slider tray 31.

As the main slider 34 moves forward, the recess 34d catches the shaft 35a so that the shaft 35a engages with the linear portion of the J-shaped groove 2a and the slider tray 31 is driven.

As the main slider 34 moves forward, the carrier pull-out member 36 first moves forward, and next the slider tray 31 together with the carrier pull-out member 36 moves forward. As the carrier pull-out member 36 moves forward, the carrier 20 in the stocker 21 is pulled forward and the front end thereof is placed on tongues 32a and 32a of a lower plate 32 fastened to the slider tray 31.

In the state that the slider tray 31 is accommodated in the housing, the tongues 32a and 32a are fitted in recesses 1f and 1f formed in a frame upper plane 1e of the main chassis 1 and are adjacent to the carrier 20 in the stocker 21. As the carrier 20 is pulled out in the above manner, recesses 20d and 20d of the carrier 20 at the front end thereof engage with projections 31b and 31b of the slider tray 31 to determine the front end position of the carrier 20 in the right and left directions. The back portion of the carrier 20 is supported by the frame upper plane 1e of the main chassis, and the positions of the carrier in the right and left directions are determined by the vertical planes of the frame upper plane 1e on the right and left sides.

As described earlier, the main slider 34 can move further back after the slider tray 31 is pulled into the housing. The main slider 34 moved further back rotates the gear 62 shown in FIGS. 4 to 6. FIG. 5 shows a state that the main slider 34 starts rotating the gear 62. As the main slider 34 moves back, the back end thereof pushes a projection 62a of the gear 62 to rotate it. The gear 62 then smoothly meshes with the rack 34b of the main slider 34 because the positional relationship between the gear 62 and main slider 34 is constant.

A loading hook support member 39 is fastened at its upper back plane, with its holes 39c and 39d being engaged with shafts 2b and 2c of the right side chassis 2. A rotary member 41 is rotatively supported by a loading hook 40, its shaft 41a engages with an L-shaped groove 39a of the loading hook support member 39, and its shaft 41b engages with a slanted groove 9d of the loading slider 9 shown in FIG. 1. Therefore, the loading hook 40 is supported being movable in the front and back directions by the loading hook support member 39 and loading slider 9.

Figure 8A:
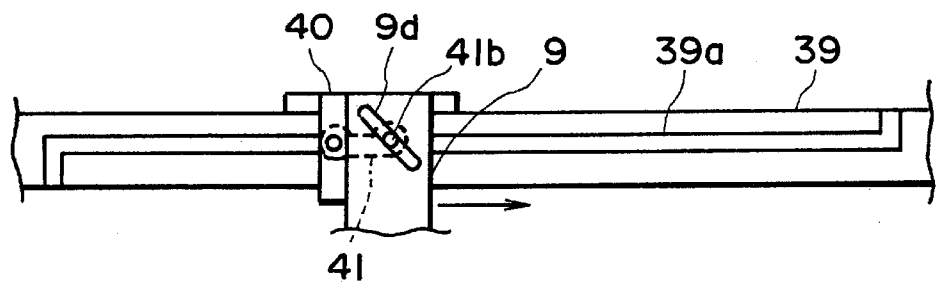
FIGS. 8A, 8B, and 8C are side views showing part of the disk reproducing apparatus according to the embodiment of the invention.
Figure 8B:
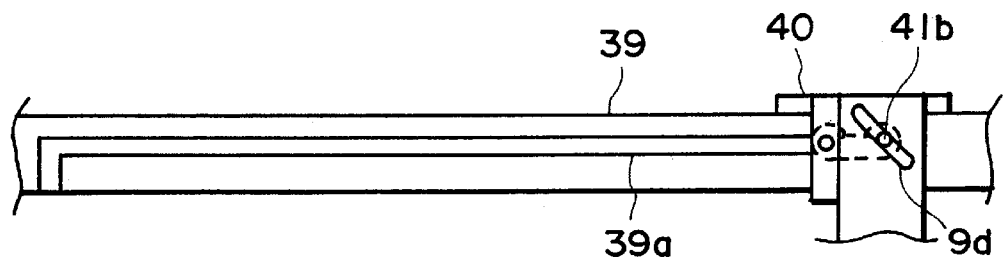
Figure 8C:
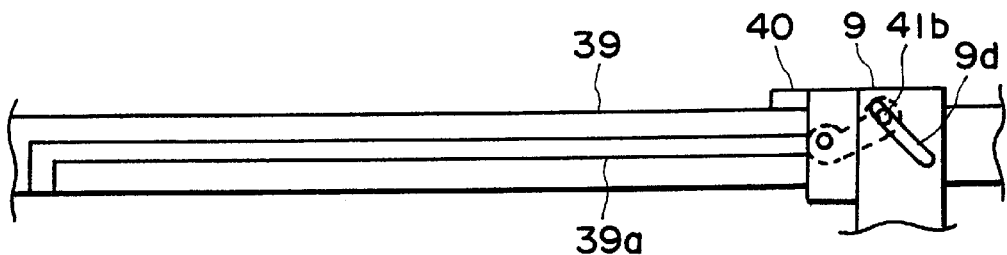

FIG. 8 shows a state that the loading slider 9 drives the loading hook 40. FIG. 8(a) shows a middle drive state of the loading hook 40. In this state, the shaft 41a (hidden by the shaft 41b) engages with the horizontal portion of the L-shaped groove 39a so that the rotary member 41 does not rotate and the loading hook 40 moves together with the loading slider 9. FIG. 8(b) shows a state that the shaft 41a engages with the rear end of the horizontal portion of the L-shaped groove 39a, and FIG. 8(c) shows a state that the loading slider 9 moves to the motion stroke end. While the loading slider 9 moves from the position shown in FIG. 8(b) to the position shown in FIG. 8(c), the loading hook 40 hardly moves so that even if the loading slider 9 bounds and the motion position varies, the stop position of the loading hook 40 is stable.

Figure 4:
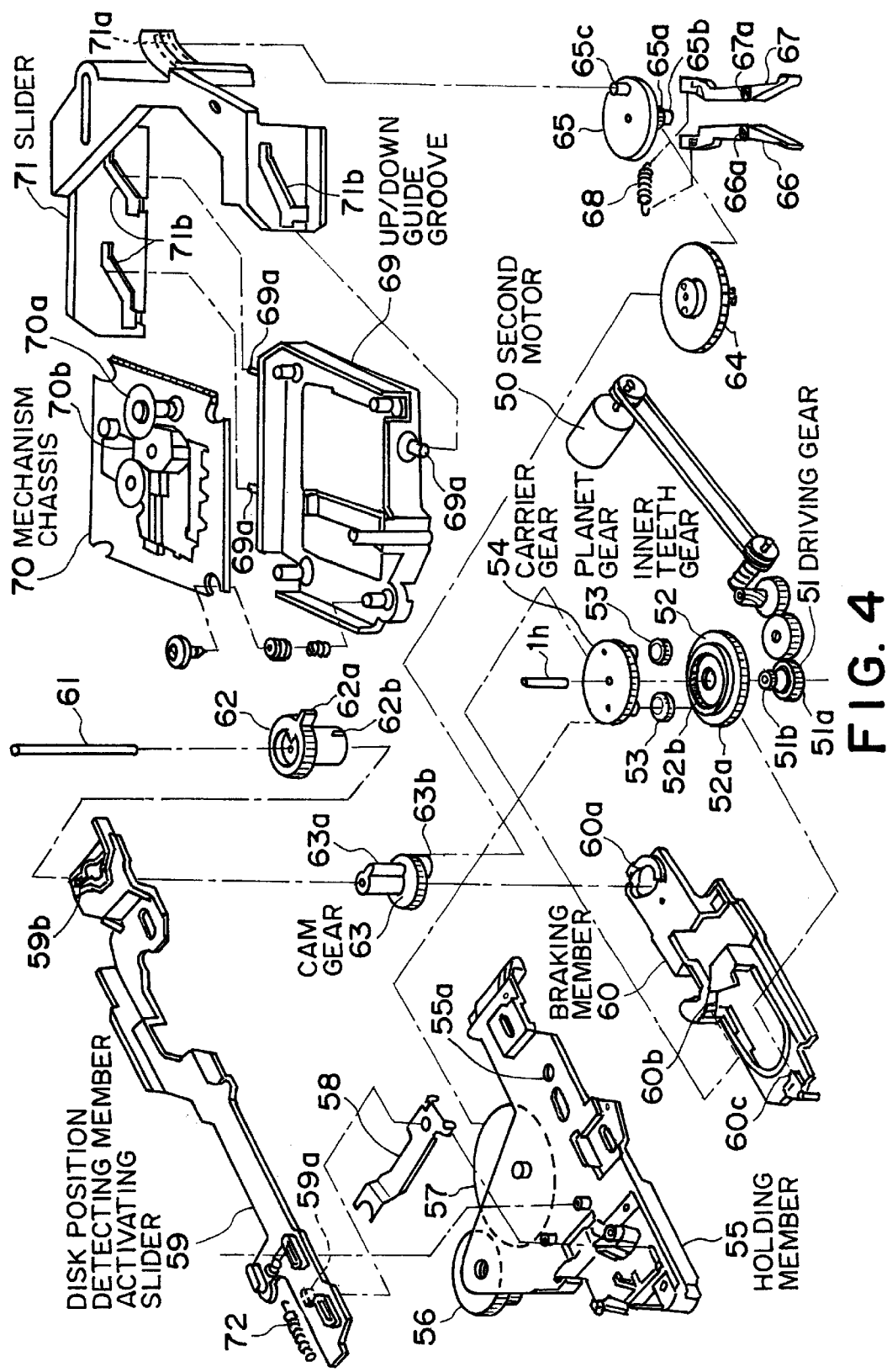
FIG. 4 is a broken perspective view showing part of the disk reproducing apparatus according to the embodiment of the invention.

As the loading hook 40 moves back, the carrier 20 in the stocker 21 is pulled out by the loading hook 40, and transported just above a turn-table 70a shown in FIGS. 4 to 6, i.e, to a loading position, being guided by a guide groove 5a of a clamper support member 5 shown in FIG. 1 and by a guide groove 39b of the loading hook support member 39 shown in FIG. 3. As above, since the carrier 20 is guided by the members fixed to the main chassis 1, it does not vibrate during transport and is reliably pulled to the guide portion.

Figure 7:
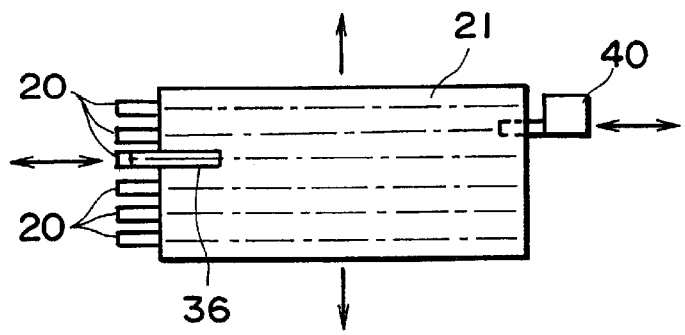
FIG. 7 is a schematic side view showing part of the disk reproducing apparatus according to the embodiment of the invention.

Both the carrier pull-out member 36 and loading hook 40 pull out the carrier 20 from the stocker 21, and they are shifted in height by one carrier step as shown in FIG. 7 so that they will not pull at the same time the same carrier 20.

A driving gear 51, an inner teeth gear 52, and a carrier gear 54 shown in FIG. 4 are rotatively supported by a shaft 1h. The lower and upper ends of the shaft 1h are respectively supported by a hole 1k of the main chassis 1 shown in FIG. 1 and a hole 55a of a holding member 55 fastened to the main chassis 1. The holding member 55 is fastened such that the hole 55a faces the hole 1k of the main chassis 1. Planet gears 53 and 53 rotatively supported by the shaft of the carrier gear 54 mesh with an inner teeth 52b of the inner teeth gear 52 and with a sun gear 51b formed with the driving gear 51. These gears constitute a planet gear mechanism.

A deceleration mechanism driven by a second motor 50 fixed to a boss 1m of the main chassis 1 shown in FIG. 1 couples with a large gear 51a of the driving gear 51. The second motor 50 rotates the driving gear 51. Rotation of the driving gear 51 is transmitted to the carrier gear 54 while the inner teeth gear 52 stops, and to the inner teeth gear 52 while the carrier gear 54 stops.

The outer teeth 52a of the inner teeth gear 52 mesh, as described previously, with the rack 9a of the loading slider 9 to drive it. The carrier gear 54 couples with the rack 25a of the stocker up/down moving slider 25 via gears 56 and 57 rotatively supported between the main chassis 1 and holding member 55, and drives the stocker up/down moving slider 25.

A shaft 61 is supported being inserted into a hole 1p formed in the bottom plane of the main chassis 1 shown in FIG. 1 and into a hole formed in the lower plane at a portion slightly rear left of the loading hook support member 39 shown in FIG. 3. The shaft 61 rotatively supports a cam gear 63 and the gear 62. A projection 63a of the cam gear 63 is fitted in a recess 62b of the gear 62, and so the cam gear 63 and gear 62 rotate together. The gear 62 is rotated by the main slider 34 as described earlier.

A disk position detecting member activating slider 59 is supported being slidable in the front and back directions, by an upper portion of the holding member via a plurality of elongated holes, and is biased in the front direction by an extension coil spring 72. The disk position detecting member activating slider 59 has a cam follower portion 59b which engages with the projection 63a of the cam gear 63 and is driven by the cam gear 63 in the front and back directions. A projection 59a formed at the lower plane of the disk position detecting member activating slider 59 engages with an edge of an arm 58 rotatively supported by the holding member 55 to rotate the arm 58.

Specifically, the main slider 34 moves up the disk position detecting member 26 shown in FIG. 2 while the carrier 20 is not being pulled out of or into the stocker 21. For example, if a carrier 20 with a 8 cm disk at a shifted position is accommodated in the stocker 21, the up motion of the disk position detecting member 26 is hindered by the shifted disk and the switch SW10 will not be activated so that a shifted disk or shifted carrier can be detected.

Since the disk position detecting member 26 is adapted to have an up/down stroke matching the carrier 20 engaged with the carrier pull-out member 36 and loading hook 40. In other words, the up/down stroke of the disk position detecting member 26 corresponds to two steps of carriers.

While the disk position detecting member 26 moves up, the rod-like projections 26a and 26b are inserted into the central hole of a disk in the stocker and the hole 20c of the carrier 20. In this case, the rod-like projection 26a abuts against the switch activating rod 11 to activate the switch SW10, and the rod-like projection 26b abuts against the engaging rod on the back surface of the stocker cover.

There is a case wherein the stocker 21 is moved up and the carrier is at the position higher than the loading hook 40. In this case, the rod-like projection 26a is not inserted into the central hole of a disk higher than the loading hook 40 and the rod-like projection 26b is not inserted into the hole 20c of the carrier 20 because of the up/down stroke of the hook position detecting member 26. However, in this case, the switch activating rod 11 is inserted into the central hole of a disk higher than the loading hook 40 and the engaging rod on the bottom surface of the stocker cover is inserted into the hole 20c of the carrier 20. Therefore, irrespective of the position of the stocker 21, the carrier 20 and a disk on the carrier 20 will not shift even if vibrations are applied while the disk position detecting member 20 moves up.

If the disk position detecting member 26 moves down, the carriers 20 in the stocker 21 can be pulled out by the carrier pull-out member 36 and loading hook 40 in the respective directions. Even if vibrations or the like are applied to the apparatus while the disk position detecting member 26 moves down, the carriers 20 at the positions where the rod-like projection 26b does not exist will not shift because the carriers 20 engage with the carrier pull-out member 36 and loading hook 40.

If tapers are provided with the front end portions of the rod-like projections 26a and 26b of the disk position detecting member 26, a small position shift of the disk or carrier can be corrected while the disk position detecting member 26 moves up. It is also possible to prevent a contact of the carrier with the loading hook 40 or carrier pull-out member 36 while the stocker is moved up.

A braking member 60 is supported sandwiched between the main chassis 1 and holding member 55, sliding freely in the front and back directions. A cam follower portion 60a of the braking member 60 engages with a cam 63b of the cam gear 63, and the braking member 60 is driven in the front and back directions by the cam gear 63. A projection 60b of the braking member 60 stops the carrier gear 54 and a projection 60c stops the inner teeth gear 52. As described previously, while the carrier gear 54 stops, the inner teeth gear 52 is driven and rotated, whereas while the inner teeth gear 52 stops, the carrier gear 54 is driven. Therefore, a motion of the main slider 34 switches a power transmission of the second motor 50. The braking member 60 and its drive mechanism and the planet gear mechanism constitute a power switching means.

The cam gear 63 meshes with a gear 64 rotatively supported on the main chassis 1 slightly rear right. The gear 64 meshes with teeth 65a formed on a rotary member 65 rotatively supported by a shaft 1n of the main chassis 1. A shaft 65c of the rotary member 65 engages with a J-shaped groove 71a of a slider 71 supported in a slide way at the rear portion of the main chassis 1. The radius of an arc portion of the J-shaped groove 71a is the same as the rotation radius of the shaft 65c, and the slider 71 moves or stops while the rotary member 65 rotates.

Shafts 69a, 69a, . . . of an up/down moving member 69 engage with the vertical guide grooves 1b, 1b, . . . of the main chassis 1 and oblique up/down guide grooves 71b, 71b, . . . of the slider 71. Therefore, the up/down moving member 69 is moved up and down by the main slider 34 via the gear 62, . . . , and slider 71. A mechanism chassis 70 is mounted on the up/down moving member 69 via springs and dampers.

A disk motor is fixed to the mechanism chassis 70, and a turn-table 70a is fixedly mounted on the rotation shaft of the disk motor. An optical pickup 70b is mounted on the mechanism chassis 70 such that it is moved in the radial direction of a disk held by the turn-table 70a. The switch SW1 is activated when the optical pickup 70b is at the home position where the optical pickup 70b is remotest from the turn-table 70a, to thereby detect the home position of the optical pickup.

As the mechanism chassis 70b and hence the turn-table 70a rises, a disk on the carrier 20 is clamped by the turn-table 70a and the clamper 10 and rotated by the disk motor. While the disk rotates, the optical pickup 70b is moved in the disk radial direction to reproduce signals recorded on the disk. Components mounted on the mechanism chassis 70, clamper 10, and a drive mechanism for the mechanism chassis 70 constitute a reproducing means.

Levers 66 and 67 have holes 66a and 67a with shafts (not shown) of the main chassis 1 being fitted therein at the position near the rotary member 65 to be rotatively supported by the main chassis 1. The levers 66 and 67 are energized by an extension coil spring 68 so that the rear ends thereof abut against the cam 65 of the rotary member 65. The front ends of the levers 66 and 67 abut against the switches SW4 and SW5, respectively.

The levers 66 and 67 swing about the shafts fitted in the holes 66a and 67a as the rotary member 65 rotates. The levers 66 and 67 activate the switches SW4 and SW5, respectively. The switch SW4 turns on when the mechanism chassis 70 rises or immediately before it starts lowering. The switch SW5 turns on when the mechanism chassis 70 lowers or immediately before it starts rising.

The chart shown in FIG. 9 illustrates operation timings of each member described above. The abscissa of FIGS. 9(a) to 9(h) represents a main slider stroke in the same scale. A main slider motion start point A is the most forward position of the main slider, and a main slider motion end point B is the most backward position of the main slider.

FIGS. 9(b) and 9(c) show the motion period of the slider tray 31 and carrier 10, respectively. A motion end point C of the slider tray 31 is earlier than a motion end point D of the carrier 20. FIG. 9(d) shows the up/down motion state of the disk position detecting member 26. FIG. 9(e) shows the up/down motion state of the turn-table. The up-position point G of the turn-table is detected by the switch SW4 as described earlier. FIG. 9(f) shows the rotation state of the cam gear 63. FIG. 9(g) shows the rotatable state of the planet gear mechanism member. The carrier can be rotated before an H point inclusive, and the inner teeth gear can be rotated after a J point inclusive.

FIG. 9(h) shows the up/down motion of the stocker and the motion state of the loading slider. The stocker is raised before a carrier rotation limit point H inclusive. The loading slider is driven at an F point inclusive when the disk position detecting member 26 lowers.

Figure 11:
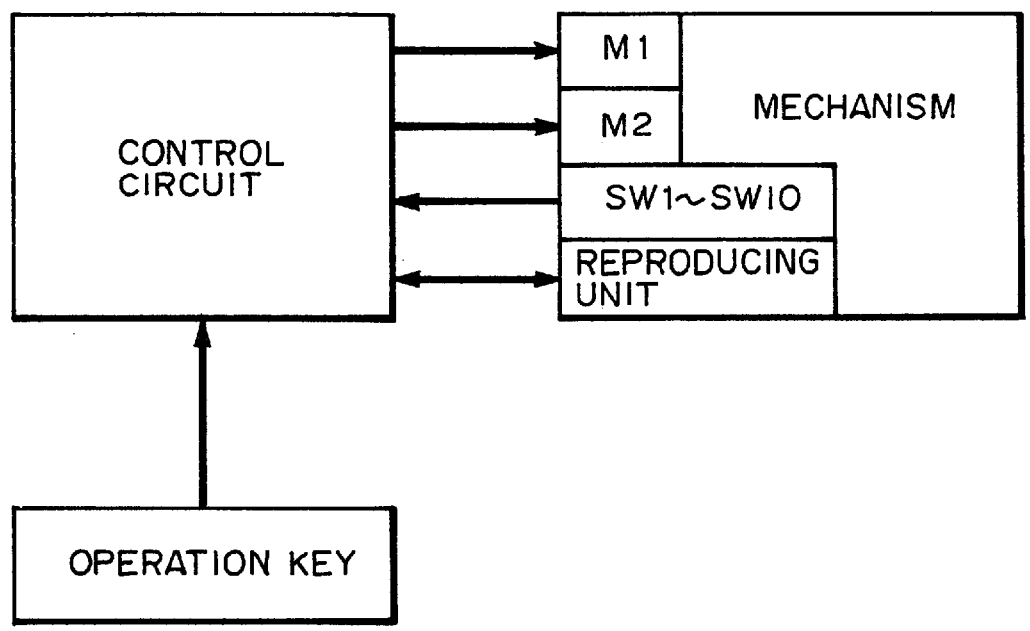
FIG. 11 is a block diagram showing a controller unit of the disk reproducing apparatus according to the embodiment of the invention.

Next, the operation of the disk reproducing apparatus constructed as above will be described. The control circuit shown in FIG. 11 has a microcomputer, a memory, an input/output interface, a driver, and the like. A signal form each operation key and a signal from each the switch SW1 to SW10 are input to the control circuit which drives the first motor (M1) and second motor (M2), outputs a play signal to a reproduction unit, drives the disk motor and pickup feed motor of the reproduction unit.

In accordance with the activation of each switch SW1–SW10 and an input by an unrepresented key mounted on the front panel of the housing, the control circuit controls the apparatus. As shown in FIG. 5, at the initial stage, the carrier pull-out member 36 and loading hook 40 engage with the carriers 20, 20 in the stocker 21. The main slider 34 is just before the position detaching from the gear 62, and the gear 62 rotates in the clockwise direction as viewed from the above.

The turn-table 70a is at a raised position. The stocker 21 is at the lowest position. The braking member 60 is at the back position, and the projection 60c meshes with the inner teeth gear 52 to stop it (at this time, the switches SW2, SW4, and SW8 are on and the switches SW5 and SW7 are off). Therefore, the second motor 50 can rotate only the carrier gear 54. The second motor 50 moves the stocker up/down moving slider 25 to move the stocker 21 shown in FIG. 2 up and down.

Under this condition, the stocker 21 is moved up and down so that the height of the carrier of a disk to be reproduced can be adjusted to the height of the loading hook 40 to select the disk. Specifically, the second motor raises the stocker 21 and the counter of the control circuit for storing the stocker position counts up starting from "0" upon each on/off of the switch SW6 so that the height of the carrier of a disk to be reproduced can be adjusted to the height of the loading hook 40. The height of the carrier 20 for which a disk is exchanged can be adjusted to the height of the carrier pull-out member 36.

First, a disk exchange will be described. Although the disk exchange can be performed at the initial stage, it may also be performed in the reproduction state wherein the loading hook 40 has moved the carrier 20 and placed it on the turn-table 70a (at this time, the switch SW7 is on and the switch SW8 is on). Specifically, as described earlier, when the main slider 34 is at the position shown in FIG. 5, the turn-table 70a is at the raised position. If some carrier 20 is moved by the loading hook 40 onto the turn-table 70a before the turn-table 70a is raised, the disk on the carrier 20 is held by the turn-table 70a and clamper 10 and is in the reproduction state. Even if the main slider 34 moves forward (downward as viewed in FIG. 5) from the position shown in FIG. 5, the state of the braking member 60 does not change and the gear 52 will not rotate so that the reproduction state does not change.

The second motor 50 moves the stocker up/down slider 25 and moves the stocker 21 up and down to adjust the height of the carrier 20 for which a disk is exchanged to the height of the carrier pull-out member 36, and thereafter the main slider 34 is moved forward by the first motor 7.

At the initial stage of the motion stroke of the main slider 34, the rotary member 35 shown in FIG. 3 rotates in the clockwise direction as view from the above, and its shaft 35a engages with the J-shaped groove 2a of the right side chassis 2 shown in FIG. 1 at the portion perpendicular to the motion direction of the slider tray 31. Therefore, the motion of the shaft 35a of the rotary member 35 is restricted in the front and back directions so that the slider tray 31 supporting the rotary member 35 does not move.

Similarly, the carrier pull-out member 36 does not move at the initial stage of the forward stroke of the main slider 34. At the midst of the forward stroke of the main slider 34, the rotary member 37 shown in FIG. 3 rotates by being guided by the recess 34c of the main slider 34, the shaft 37a of the rotary member 37 enters the linear portion of the J-shaped groove 31a, and the carrier pull-out member 36 is driven forward. The carrier 20 is transported, and its front end portion rides on the tongues 32a and 32a of the lower plate 31 and is supported by the slider tray 31.

As the main slider 34 further moves, the recess 34d of the main slider 34 engages with the shaft 35a so that the rotary member 35 rotates in the counter-clockwise direction. Then, the shaft 35s engages with the J-shaped groove 2a at the portion extending in the motion direction of the slider tray 31 so that the slider tray 31 is made movable and the recess 34d pushes the shaft 35a to move the slider tray 31 forward, i.e., in the direction of protruding from the housing.

Specifically, the slider tray 31 moves from the position shown in FIG. 5 to the position shown in FIG. 6. At this time, the switch SW3 turns off. In the state shown in FIG. 6, the slider tray 31 protrudes from the housing and the carrier pull-out member 36 makes the carrier 20 protrude together with the slider tray 31. In the state shown in FIG. 6, the disk on the carrier 20 is exchanged or a disk is additionally placed on the carrier 20.

In accommodating the carrier 20 in the stocker 21, the motor 7 is rotated in the reverse direction. In this case, the shaft 35a is guided by the J-shaped groove 2a and the rotary member 35 rotates in the clockwise direction. Therefore, after the slider tray 31 is moved back (this state is detected from a turn-on of the switch SW4), the main slider 34 can be moved back further. The stocker is moved up and down to select a carrier which is protruded from the housing to exchange a disk. By repeating this operation, all disks on the carriers can be exchanged.

Next, the operation of reproducing a desired disk on a carrier, starting from the initial stage, will be described. At the initial stage shown in FIG. 5, the stocker is moved up and down to adjust the height of the disk on the carrier 20 to be reproduced to the height of the loading hook 40. Thereafter, the first motor 7 moves the main slider 34 back so that the teeth of the gear 62 mesh with the rack 34b and the gear 62 and cam gear 63 rotate in the counter-clockwise direction.

Therefore, the turn-table 71a lowers from the raised position and the braking member 60 moves forward to stop the carrier gear 54 (this state is detected from a turn-on of the switch SW5). While the cam gear 63 rotates from the D point shown in FIG. 9(f) to the B point, the disk position detecting member 26 temporarily moves up and thereafter moves down, as shown in FIG. 9(d).

The second motor 50 therefore rotates the inner teeth gear 52 and the loading slider 9 is moved back. The carrier 20 is moved onto the turn-table 70a by the loading slider 9 and loading hook 40 (this state is detected from a turn-on of the switch SW7).

Thereafter, the first motor 7 rotates in the direction opposite to the previous direction to move the main slider 34 forward to just before the position detaching from the gear 62 (position shown in FIG. 5), and the turn-table 70a rises and the disk is clamped to enter the reproduction state (this state is detected from a turn-on of the switch SW4). In this state, the first motor 7 can move the main slider 34 and a disk can be exchanged as described previously. Namely, with this apparatus, a disk can be exchanged during the reproduction.

The operation of moving a disk back to the stocker 21 after the reproduction can be achieved by rotating the first and second motors 7 and 50 in the direction opposite to the direction when a disk is mounted on the turn-table. Specifically, first, the motor 50 moves the main slider 34 from the D point shown in FIG. 9 to the B point (the main slider 34 moves back from the position shown in FIG. 5. This state is detected from a turn-on of the switch SW5). Thereafter, the second motor 50 moves forward the loading slider 9 from the reproduction position to the position shown in FIG. 5 to accommodate the carrier 20 in the stocker 21. This state is the initial stage shown in FIG. 5 (this state is detected from a turn-on of the switch SW8). The position of the carrier whose disk is under the reproduction is stored in the control circuit which controls to move the disk after the reproduction back to the original position.

Reproduction of a disk or exchange of a disk in the stocker is performed in the above manner. When the slider tray 31 is moved from the outside of the housing to the inside of the housing, i.e., after the carrier 20 at the outside of the housing is accommodated in the stocker 21, the main slider 34 is moved to the G point shown in FIG. 9 (this state is detected from a turn-on of the switch SW4). Although the disk position detecting member 26 is raised by moving the main slider 34 in the above manner, the rise of the disk position detecting member 26 may be hindered by the shifted disk or carrier 20 and the switch SW10 is not activated. In such a case, the slider tray 31 is moved to the outside of the housing to correct the position of the shifted disk, and thereafter it is moved into the housing.

The disk position detecting member 26 is also raised when the carrier 20 is moved from the reproduction position back to the stocker 21. If the position of the disk or carrier is shifted, the carrier 20 is moved to the outside of the housing. In this case, the stocker 21 is lowered by one step of carriers. After the height of the carrier is adjusted to the height of the carrier pull-out member 36, the main slider 33 is moved to the outside of the housing.

In stopping the apparatus after disk reproduction or disk exchange, the disk position detecting member 26 is raised and the stocker 21 is lowered to insert the disk position detecting member 26 through all the disks and carriers in the stocker. With this setting, even if a force is applied to the disk and carrier in the stocker 21 during the transport of the apparatus, the position of the disk and carrier can be prevented from being shifted.

Next, the process of loading a disk in the apparatus and unloading it from the apparatus will be described. The operation keys shown in FIG. 11 include, in addition to a reproduction key and a reproduction stop key, six tray open/close keys corresponding to six carriers. These tray open/close keys each have a function of opening/closing a corresponding carrier. Namely, as the tray open/close key is pushed, the corresponding carrier is accommodated in the stocker if it is outside of the housing, and it is moved to the outside of the housing if it is not. Each open/close key may include a key for designating a carrier, and a key for protruding or accommodating the carrier designated by the key.

Figure 12:
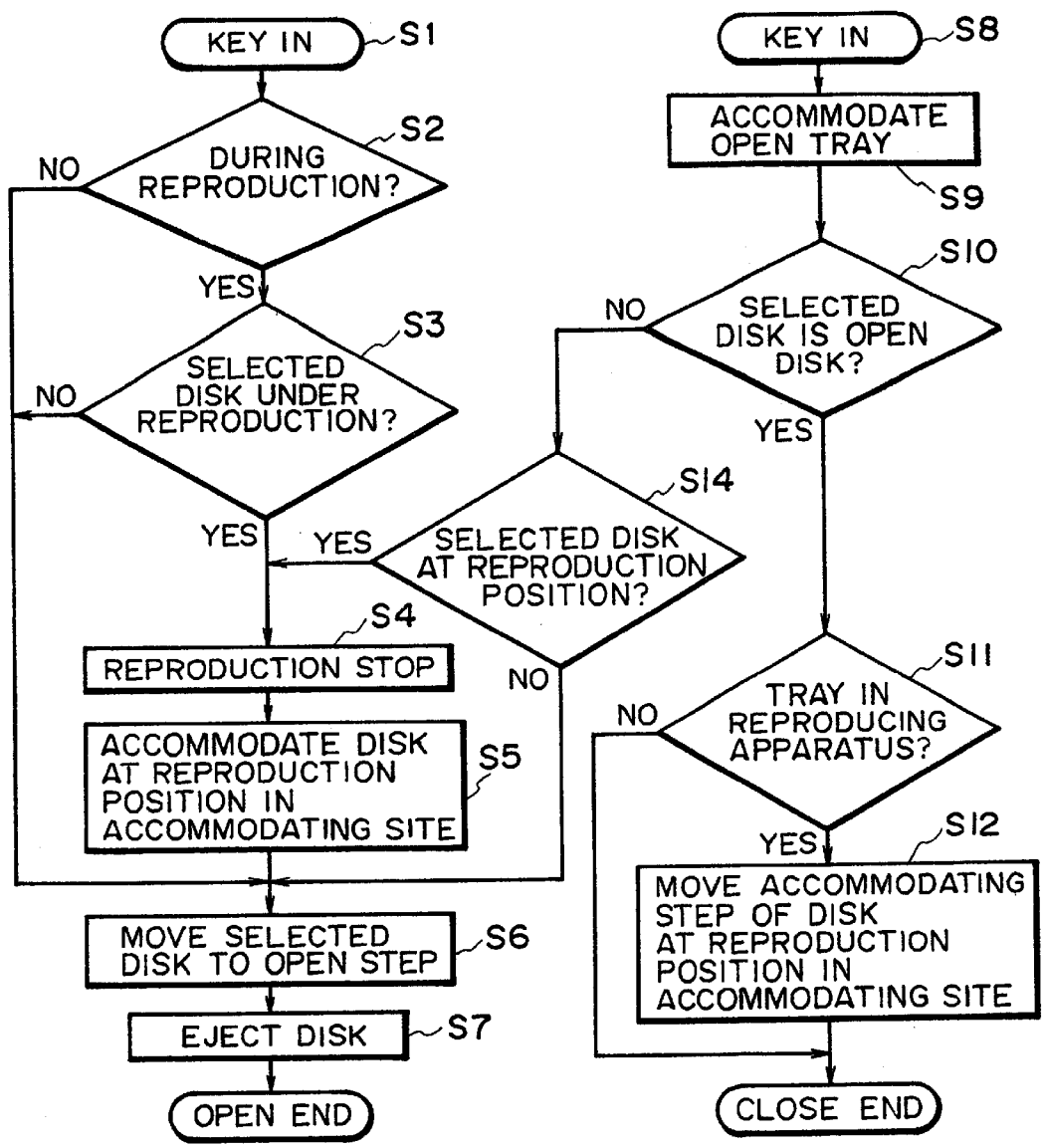
FIG. 12 is a flow chart illustrating the operation of the disk reproducing apparatus according to the embodiment of the invention.
Figure 13:
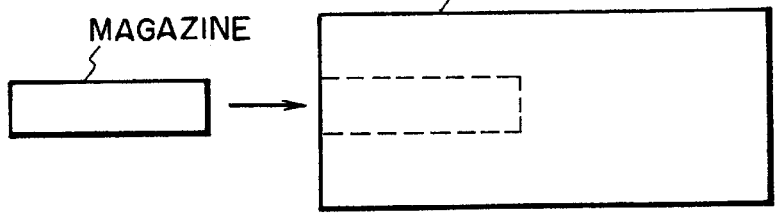
FIG. 13 is a schematic diagram showing a conventional example.
Figure 14A:
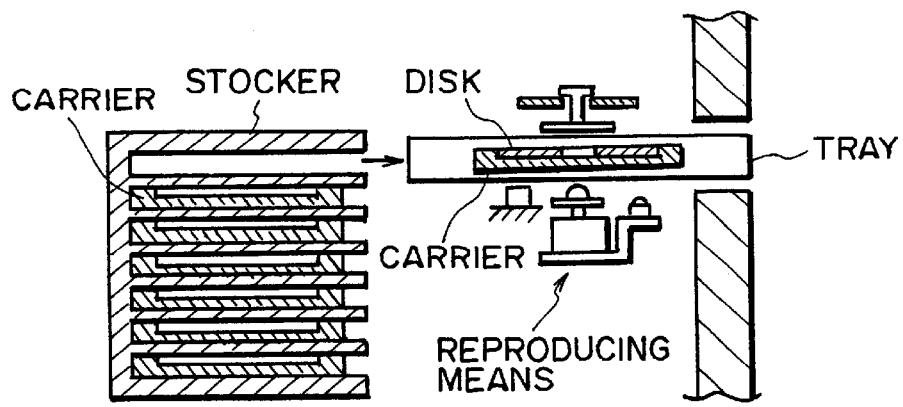
FIGS. 14A, 14B, and 14C are schematic diagrams showing another conventional example.
Figure 14B:
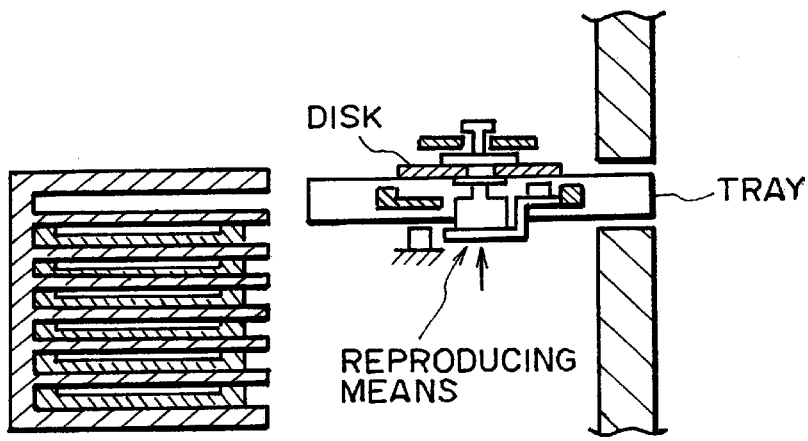
Figure 14C:
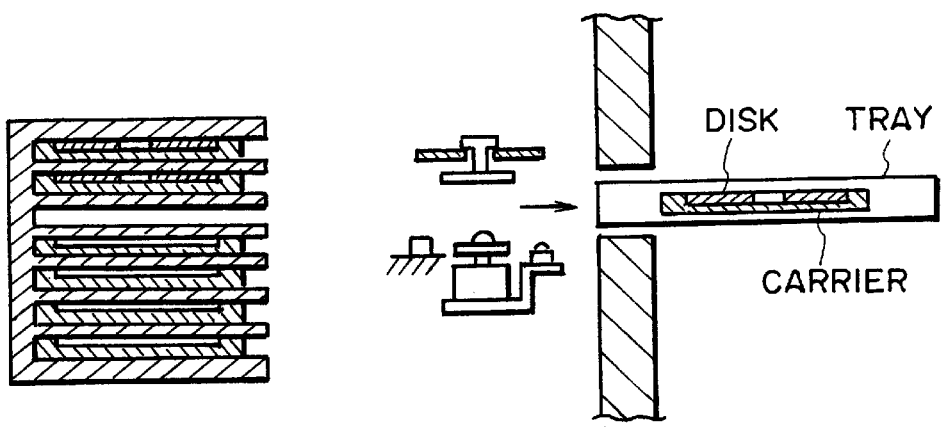

FIG. 12 shows a routine when a tray open/close key is pushed. Step S1 indicates an operation when the tray open/close key is pushed under the condition that the slider tray 34 is in the housing. Step S8 indicates an operation when the tray open/close key is pushed under the condition that the slider tray 34 is protruded from the housing.

If it is judged at step S1 that the tray open/close key has been pushed, it is judged next at step S2 whether the reproduction signal is output. Namely, it is judged whether a disk is under the reproduction. If under the reproduction, the flow advances to step S3, and if not, the flow advances to step S6. It is judged at step S3 whether a disk on the carrier corresponding to the pushed tray open/close key is under the reproduction. If under the reproduction, the flow advances to step S4, and if not, the flow advances to step S6.

At step S6, the reproduction is stopped and the turntable is lowered. Next, at step S5 the carrier at the reproduction position is accommodated in the stocker at the original position, and the flow advances to step S6. At step S6, the stocker 21 is moved up and down to adjust the height of the carrier corresponding to the pushed tray open/close key to the height of the pull-out member 36. Next, at step S7 the slider tray 34 is protruded from the housing to expose the carrier corresponding to the pushed tray open/close key to terminate this routine.

If it is judged at step S8 that the tray open/close key has been pushed, the flow advances to step S9 whereat the slider tray 34 is moved from the outside to the inside of the housing. Next, at step S10 it is judged whether the disk on the carrier corresponding to the pushed tray open/close key is the disk exposed in the outside of the housing. If not, the flow advances to step S11, and if affirmative, the flow advances to step S14.

At step S14 it is judged whether the carrier corresponding to the pushed tray open/close key is at the reproduction position. If affirmative, the flow advances to step S4, and if not, the flow returns to step S6 and succeeding steps.

At step S11 it is judged whether there is a carrier at the reproduction position. If affirmative, the flow advances to step S12, and if not, this routine is terminated. At step S12, the stocker 21 is moved up and down to set the height of the carrier in the stocker 21 at the reproduction position to the height allowing the loading hook 40 to pull out the carrier. This embodiment constructed as above can process various states of the apparatus. The flow chart shown in FIG. 12 will be described in detail in correspondence with each state of the apparatus.

First, a state of the apparatus with the slider tray 31 being accommodated in the apparatus will be described. This state includes two cases, (1) wherein all carriers 20 are accommodated in the stocker, and (2) wherein a disk is under the reproduction and the other carriers 20 are accommodated in the stocker.

In the case (1), if a desired carrier 20 is to be pulled out from the stocker and protruded from the apparatus, the open/close key corresponding to the desired carrier 20 is activated to transport the desired carrier outside of the apparatus through steps S1, S2, S6, and S7.

In the case (2), if a desired carrier 20 in the stocker 21 is to be protruded from the apparatus, the open/close key corresponding to the desired carrier 20 is activated to transport the desired carrier 20 in the stocker 21 outside of the apparatus through steps S1, S2, S3, S6, and S7. Namely, a user can exchange an disk to be accommodated in the stocker while listening to music or the like of another disk under the reproduction.

In the case (2), if the disk under the reproduction is to be transported outside of the apparatus, the open/close key corresponding to the desired carrier 20 whose disk is under the reproduction is activated to transport the disk under the reproduction outside of the apparatus through steps S1, S2, S3, S4, S5, S6, and S7. Namely, a user can stop the reproduction of the disk and transport it outside of the apparatus only by activating the open/close key once.

Next, a state of the apparatus with the carrier 20 being protruded from the apparatus will be described. This state includes two cases, (3) wherein the carrier 20 is protruded from the apparatus and all carriers 20 are accommodated in the stocker, and (4) wherein the carrier is protruded from the apparatus and a disk is under the reproduction and the other carriers 20 are accommodated in the stocker.

In the case (3), if the carrier 20 protruded from the apparatus is to be simply accommodated in the stocker 21, the open/close key corresponding to the carrier 20 outside of the apparatus is activated to accommodate the carrier 20 outside of the apparatus in the stocker 21 through the steps S8, S9, S10, and S11.

In both the cases (3) and (4), the carrier 20 is outside of the apparatus as described above. Namely, a user can place a desired disk on the carrier 20 outside of the apparatus. In this case, the user placed a desired disk on the carrier 20 outside of the apparatus desires in some cases to exchange a disk in the stocker 21.

If a user requests for such a case, in the case (3) the open/close key corresponding to the desired carrier in the stocker 21 is activated to perform the steps S8, S9, S10, S14, S6, and S7. By pressing once the open/close key corresponding to the desired carrier in the stocker 21, it becomes possible to accommodate the carrier protruded from the apparatus in the stocker and to protrude another carrier 20 in the stocker 21 from the apparatus.

In the case (4), if the carrier 20 protruded from the apparatus is to be simply accommodated in the stocker, the open/close key corresponding to the carrier 20 protruded from the apparatus is activated to accommodate the carrier 20 outside of the apparatus in the stocker 21 through the steps S8, S9, S10, S11, and S12.

The meaning of step S12 will be described. In the state at step S8, two carriers 20 are not accommodated in the stocker 21. The two carriers 20 are the carrier 20 protruded from the apparatus and the carrier 20 whose disk is under the reproduction. At step S9, the carrier 20 outside of the apparatus is accommodated in the stocker 21. Therefore, the stocker 21 has an empty step only at the place where the carrier 20 whose disk is under the reproduction was accommodated. At step S12, the stocker 21 is driven so that the empty step of the stocker 21 moves to the place where the carrier 20 whose disk is under the reproduction is accommodated. If a user wants an operation of moving the disk at he reproduction position back to the stocker 21, such as reproducing a new disk, the disk at the reproduction position can be quickly accommodated in the stocker 21. In the case (4), if the carrier 20 protruded from the apparatus is to be accommodated in the stocker 21 and the other carrier in the stocker is to be protruded from the apparatus, the open/close key corresponding to the carrier 20 in the stocker 21 is activated to execute the steps S8, S9, S10, S11, S14, S6, and S7. Even if the disk is under the reproduction by the reproducing means, a complicated operation can be performed without changing the reproducing state only be activating the open/close key corresponding to the desired carrier 20.

In the case (4), if the disk under the reproduction is to be protruded from the apparatus, the open/close key corresponding to the carrier 20 on which the disk under the reproduction is to be placed is activated to execute the steps S8, S9, S10, S14, S4, S5, S6, and S7. Only by activating the open/close key corresponding to the carrier on which the disk under the reproduction is to be placed, a complicated operation can be performed which accommodates the carrier 20 outside of the apparatus in the stocker 21, stops the reproduction of the disk at the reproduction position, and protrudes this disk from the apparatus. In the above manner, the carrier selected by the tray open/close key can be exposed to the outside of the housing and disks can be added or exchanged. It is also possible to accommodate the carrier outside of the housing in the housing, by using the same tray open/close key. Even if a disk other than the disk to be exposed to the outside of the housing is under the reproduction, the carrier selected by the tray open/close key can be exposed to the outside of the housing, without stopping the reproduction. Therefore, disks in the stocker 21 can be exchanged or disks can be added to the stocker 21, during the reproduction.

According to the present invention, even if the recording medium reproducing apparatus has a complicated structure including: a stocker capable of accommodating a recording medium; reproducing means for reproducing the recording medium; first transport means for transporting the recording medium between the stocker and the outside of the apparatus; second transport means for transporting the recording medium between the stocker and a reproduction position; and position determining means for determining a relative height of the recording medium and the first or second transport means, a desired operation can be executed only by activating the open/close key. Accordingly it becomes possible to provide a recording medium reproducing apparatus very easy to use.

Specifically, upon activation of the open/close key, the recording medium can be accommodated in the stocker if the recording medium is protruded from the apparatus, the recording medium can be protruded from a housing if the recording medium is accommodated in the stocker, or the recording medium can be accommodated in the stocker and protruded from the apparatus after the reproduction is stopped if the recording medium is under the reproduction.

Further, upon activation of the open/close key designating one recording medium accommodated in the stocker in a state that another recording medium is protruded from the apparatus, the other recording medium outside of the apparatus can be accommodated in the stocker and the selected one recording medium can be protruded from a housing.

Still further, upon activation of the open/close key designating one recording medium under the reproduction in a state that another recording medium is protruded from the apparatus, the other recording medium outside of the apparatus can be accommodated in the stocker, the reproduction of the one recording medium can be stopped, and the one recording medium can be accommodated in the stocker and protruded from a housing.

Furthermore, upon activation of the open/close key designating one recording medium not under the reproduction in a state that another recording medium is under the reproduction, the one recording medium can be protruded from the apparatus and accommodated in the apparatus, and the place of the stocker where the other recording medium under the reproduction can be moved to the place where the other recording medium under the reproduction is accommodated.

In this case, after the reproduction of a recording medium is completed or in other cases, the recording medium can be quickly moved into the stocker so that the user can use the apparatus easily.

REFERENCE NUMERAL TABLE

1 . . . main chassis, 1a, 1b . . . guide groove, 1c, 1d . . . guide rod, 1e . . . frame upper surface, 1f . . . recess, 2 . . . right side chassis, 2a . . . J-shaped groove, 3 . . . gear train support member, 4 . . . guide plate, 5 . . . clamper support member, 5a . . . guide groove, 6 . . . stocker cover, 7 . . . first motor, 8 . . . gear, 9 . . . loading slider, 9a . . . rack, 9b, 9c . . . projection, 9d . . . slanted groove, 10 . . . clamper, 11 . . . switch activating rod, 12 . . . switch board, 13 . . . switch activating slider, 13a . . . projection, 20 . . . carrier, 20a, 20b . . . hook engaging notch, 20c . . . hole, 20d . . . recess, 20e . . . large diameter disk recess, 20f . . . small diameter disk recess, 20g . . . recess, 21 . . . stocker, 21a . . . groove, 21b . . . shaft, 22 . . . front plate, 22a . . . shaft, 23 . . . back plate, 23a . . . shaft, 23b . . . tongue, 24 . . . plate spring, 25 . . . stocker up/down moving slider, 25a . . . rack, 25b . . . groove, 25c . . . stepwise groove, 25d . . . hole, 26 . . . disk position detecting member, 25a, 26b . . . rod-like projection, 27 . . . compression coil spring, 28 . . . switch activating arm, 28a . . . hole, 28b . . . projection, 29 . . . switch activating arm, 29*a* . . . shaft, 29*b* . . . projection, 31 . . . slider tray, 31*a* . . . J-shaped groove, 31*b* . . . projection, 32 . . . lower plate, 32*a* . . . tongue, 33 . . . guide plate, 34 . . . main slider, 34*a*, 34*b* . . . rack, 34*c*, 34*d* . . . recess, 35 . . . rotary member, 35*a* . . . shaft, 36 . . . carrier pull-out member, 36*a* . . . hook, 37 . . . rotary member, 37*a* . . . shaft, 38 . . . switch holding member, 39 . . . loading hook support member, 39*a* . . . L-shaped groove, 39*b* . . . guide groove, 40 . . . loading hook, 40*a* . . . hook, 41 . . . rotary member, 41*a*, 41*b* . . . shaft, 50 . . . second motor, 51 . . . driving gear, 51*a* . . . large gear, 51*b* . . . sun gear, 52 . . . inner teeth gear, 52*a* . . . outer teeth, 52*b* . . . inner teeth, 53 . . . planet gear, 54 . . . carrier gear, 55 . . . holding member, 56, 57 . . . gear, 58 . . . arm, 59 . . . disk position detecting member activating slider, 59*a* . . . projection, 59*b* . . . cam follower portion, 60 . . . braking member, 60*a* . . . cam follower portion, 60*b*, 60*c* . . . projection, 61 . . . shaft, 62 . . . gear, 62*a* . . . projection, 62*b* . . . recess, 63 . . . cam gear, 63*a* . . . projection, 63*b* . . . cam, 64 . . . gear, 65 . . . rotary member, 65*a* . . . teeth, 65*b* . . . cam, 65*c* . . . shaft, 66, 67 . . . lever, 68 . . . extension coil spring, 69 . . . up/down moving member, 69*a* . . . shaft, 70 . . . mechanism chassis, 70*a* . . . turn-table, 70*b* . . . optical pickup, 71 . . . slider, 71*a* . . . J-shaped groove, 71*b* . . . up/down guide groove, 72 . . . extension coil spring, SW2–SW10 . . . switch

What is claimed is:

1. A disc reproducing apparatus comprising:

means for reproducing a disc on a turntable;

a stocker for accommodating a plurality of discs, each of which is put on a corresponding one of a plurality of shelves of the stocker; first transport means for engaging a disc accommodated within the stocker at a first height level and transporting the engaged disc between a position where the disc is accommodated within the stocker and a position where the disc is projected outside the apparatus body for replacement of the projected disc; second transport means for engaging a disc accommodated within the stocker at a second height level and transporting the engaged disc between a position where the disc is accommodated within the stocker and a position on the turntable for reproduction; stocker drive means for moving upward or downward the stocker so that a designated disc accommodated within the stocker is positioned flush with the first height level of the first transport means or the second height level of the second transport means; and control means for controlling the first and second transport means and the stocker drive means, and an open/close key means for designating one of the plurality of shelves and instructing the control means so that a disc on the designated shelf is projected outside the apparatus body or a disc projecting outside the apparatus body is accommodated into the designated shelf of the stocker, wherein, when the open/close key means designates one of the plurality of shelves on which one disc under reproduction is to be put while another disc is projecting outside the apparatus body, the control means controls the stocker drive means and the first and second transport means so that said another disc is accommodated into a shelf of the stocker on which said another disc was put before being projected outside the apparatus, and said one disc under reproduction is accommodated into the designated shelf of the stocker and subsequently projected outside the apparatus.

2. A stocker control method for a disc reproducing apparatus comprising means for reproducing a disc on a turntable; a stocker for accommodating a plurality of discs; each of which is put on a corresponding one of a plurality of shelves of the stocker; first transport means for engaging a disc accommodated within the stocker at a first height level and transporting the engaged disc between a position where the disc is accommodated within the stocker and a position where the disc is projected outside the apparatus body for replacement of the projected disc; second transport means for engaging a disc accommodated within the stocker at a second height level and transporting the engaged disc between a position where the disc is accommodated within the stocker and a position on the turntable for reproduction; stocker drive means for moving upward or downward the stocker so that a designated disc accommodated within the stocker is positioned flush with the first height level of the first transport means or the second height level of the second transport means; and control means for controlling the first and second transport means and the stocker drive means, and a open/close key means for designating one of the plurality of shelves and instructing the control means so that a disc on the designated shelf is projected outside the apparatus body or a disc projecting outside the apparatus body is accommodated into the designated shelf of the stocker, the method comprising the steps of operating the open/close key means to designate one of the plurality of shelves on which one disc under reproduction is to be put while another disc is projecting outside the apparatus body and, controlling the stocker drive means and the first and second transport means so that said another disc is accommodated into a shelf of the stocker on which said another disc was put before being projected outside the apparatus, and said one disc under reproduction is accommodated into the designated shelf of the stocker and subsequently projected outside the apparatus.

* * * * *